Figure 1:
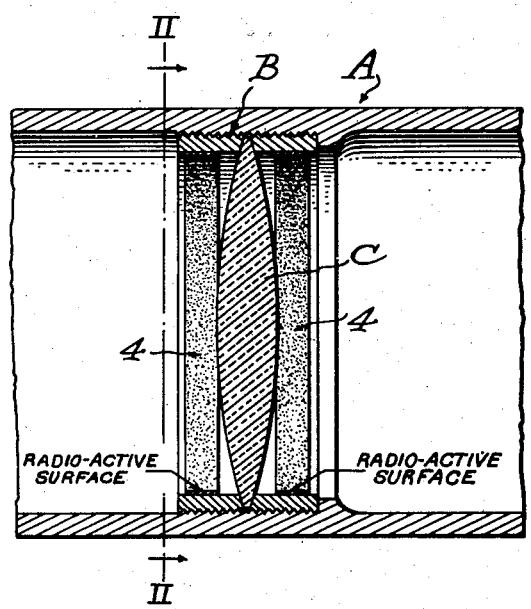

Aug. 16, 1949.                R. E. VICKLUND                2,478,955
                      PROTECTION OF OPTICAL INSTRUMENTS
                             BY RADIUM EMANATIONS
                             Filed Nov. 14, 1946

Inventor
Richard E. Vicklund

By

Attorneys

Patented Aug. 16, 1949

2,478,955

UNITED STATES PATENT OFFICE 2,478,955

PROTECTION OF OPTICAL INSTRUMENTS BY RADIUM EMANATIONS

Richard E. Vicklund, Arlington, Va.

Application November 14, 1946, Serial No. 709,856

3 Claims. (Cl. 88—1)

(Granted under the act of March 3, 1883, as amended April 30, 1928; 370 O. G. 757)

The invention described herein may be manufactured and used by or for the Government for governmental purposes, without payment to me of any royalty thereon.

Under the conditions of humidity and temperature existing in most tropical areas, materials such as fabrics, leather, paper and cork, which provide nutrients for fungi, are expected to be subject to fungus attack. Glass, an inorganic material which does not provide nutrients, would not be expected to be subject to fungus attack. However, mold growth has been found on glass surfaces in optical instruments and has rendered them unserviceable in a period of weeks. Mold growth on the lenses and prisms of instruments such as binoculars, transits, telescopes, aiming circles, and sextants has resulted in the formation of cloudy films, fungus spotting, and even etching, all of which have seriously impaired vision. It was found that the fungi in most cases were obtaining sustenance from particles of dust, lint, sealing wax, dead mite bodies, or other debris which had collected on or near the edges of the lenses and prisms. The fungi may have been picked up during initial manufacture or subsequent servicing. Also, it is possible for fungus spores to be carried into an instrument by (1) small insects such as mites which are able to penetrate sealing compounds and to traverse screw threads, or (2) the air which is drawn into the instruments by "breathing."

Extensive studies on the possible use of fungicides in optical instruments have led to recommendations for the use of fungicides of a volatile nature which provide only short-term effectiveness and which, in general, are corrosive to metals. Because of the disadvantages of fungicides of a volatile nature, it has been found desirable to seek other means for inhibiting such fungus developments.

In accordance with the present invention, it is found that eminently satisfactory results are attained by subjecting the surfaces of the lenses or prisms to radium emanations.

The alpha ray of such emanations is largely responsible for the prevention of growth of microorganisms, and in carrying out the present invention, a wide radio-active surface has been used successfully, so as to obtain as much alpha radiation as possible. This radio-active surface that has been used in the investigations leading to the present invention was in the form of a metal foil coated with the radio-active material; or the radio-active substance may be coated or deposited on some other surface, such as ceramics.

In carrying out the present invention, it was found for the best protection of a lens, for example, that the radio-active film should entirely surround the surface of the lens. This procedure reduces the quantity of radio-active substance required and therefore minimizes any health hazards that might be encountered in handling radio-active substances. However, satisfactory protection can be obtained, particularly on lenses less than one inch in diameter, by placing a section of the radio-active substances at one point on the circumference of the lens and increasing the concentration of the radio-active substance. Since the alpha ray is absorbed by surfaces as thin as a sheet of paper and has a tendency to emanate perpendicularly from the radio-active surface, the radio-active surface should be placed perpendicularly to and near the surface of each lens; the best protection is offered when the emanating surface is within one-fourth inch of the lens surface.

While the foregoing explanation is applied to lenses, it will be understood that the above-described procedure is applicable to surfaces of prisms and other surfaces where light transmission or reflectance occurs. Wherever a transmitting surface such as a lens or a prism is used, the radio-active surface should be placed on both sides of the lens or prism to obtain adequate protection because the alpha radiation will not penetrate the lens or prism.

It is found in practice that a radio-active surface containing fifteen micrograms of radium per square inch provides sufficient radiation to satisfactorily inhibit the growth of microorganisms within two inches of the radio-active surface. This effective range can be extended to two and one-half inches. Radio-active surfaces containing more than fifteen micrograms of radium per square inch are satisfactory but do not increase the range effectively in which the growth of microorganisms is prevented or inhibited. Radio-active surfaces containing less than fifteen micrograms of radium per square inch are found to be effective if the area of the radio-active surface is increased. Thus, radio-active surfaces containing as low as eight micrograms per square inch have been found to be effective. The increase in area, however, increases the cost of the material, and so is undesirable from this viewpoint. When the concentration of radium on the radio-active surface is reduced below fifteen micrograms per square inch, there is not sufficient radiation to give the desired protection from the growth of microorganisms unless a suitable area of radio-active surface is used.

Assuming that a radio-active surface contains fifteen micrograms of radium per square inch, and that it is intended to completely surround a lens with the radio-active surface, the following formula may be employed to determine the width of the radio-active surface that is to be used:

$$W = \frac{r}{K}$$

where

W = width of radio-active surface in inches
r = radius of lens in inches
K = constant = 9

The derivation of this empirical formula was based on the assumption that the degree of protection from the growth of microorganisms is proportioned to the concentration of the bombardment of the lens surface by the radiations from radium and was proven by numerous practical tests. For lenses less than one inch in diameter, the width of foil required by this formula becomes very small and is difficult to handle and apply. Therefore, it is desirable to use a width of radio-active surface equal to 0.05 inch on lenses less than one inch in diameter.

The invention will be understood more readily by reference to the accompanying drawings. On the drawings the invention is shown as being applied to a double convex lens, although it will be understood that the invention is applicable equally to any other kind of light-transmitting or reflecting means, which means may be of any shape.

Figure 2:
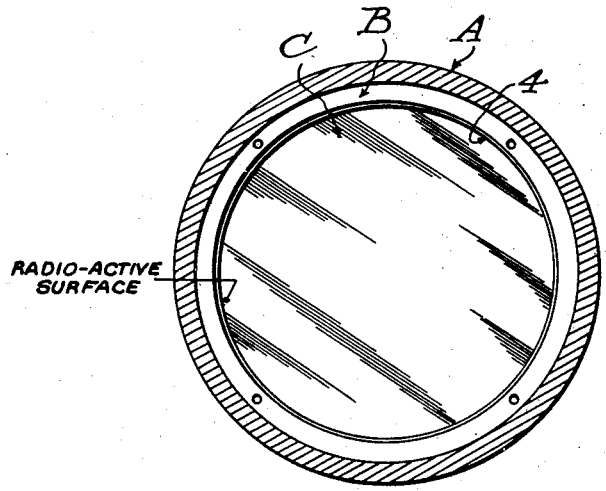

In the drawings:

Fig. 1 is a longitudinal sectional elevation of a lens mounted in a holder provided with the improved protecting means of the present invention; and Figure 2 is a transverse sectional elevation taken on the line II—II of Figure 1 looking in the direction of the arrows.

Referring more particularly to the drawings, reference character A indicates the barrel tube of an optical instrument which includes a mount B for a lens C. This lens may be of any configuration, or it may be a prism, or mirror, or any other light-transmitting or reflecting means that is to be protected by the means of the present invention.

As shown in the drawings, one embodiment of the invention is the provision of a radio-active surface 4, which may be metallic foil with radium sulphate deposited on the surface, and which is held in the lens mount B in a suitable manner, with the radio-active surface 4 perpendicular to the surfaces of the lens C. The radio-active foil may be secured to the lens mount, to the wall of the instrument, or to any other satisfactory supporting surface by means of suitable adhesives, such as rubber cement, or the foil may be welded to its support, or crimped to the support by means of a ring, or fastened by small screws. If adhesives or cement are employed, it is desirable to use a material which will not become hard and chip or flake off onto the surface to be protected.

In practice, it is found that because of the limited distance that an alpha ray will travel in air, complete protection from growth of microorganisms cannot be expected over surfaces greater than five inches across.

The invention is illustrated by the following illustrative examples:

EXAMPLE I

PRELIMINARY INVESTIGATION

A circular disc one-half inch in diameter and containing 225 micrograms of radium as radium sulphate was obtained for the preliminary investigation. This disc, composed of a thin layer of a mixture of gold and radium sulphate on a backing of silver, was covered with a shell of gold foil. Two aluminum tubes two inches in diameter and three inches long were used to simulate the casing of an optical instrument. The tubes contained several small holes to permit the entry of fungi spores and mites, and were fitted with metal screw caps. A malt agar containing mineral nutrients was prepared and poured onto two small watch glasses which were later placed on the base cap of each tube. The disc containing the radium was suspended two inches above the surface of the agar in one of the tubes. The tubes then were capped and exposed in a tropical testing chamber for a period of five days. The chamber was maintained at a temperature of 85° F. for eighteen hours and at 75° F. for the remaining six hours of each day. The relative humidity during the eighteen hour period was maintained at approximately 90 per cent and during the six hour period at approximately 95 per cent. The chamber, the floor of which is covered with a layer of lead mold, was inoculated with twenty-five species of fungi isolated from materials contaminated in tropical areas. Upon completion of the five day exposure, the watch glasses containing agar, which were placed in the tubes, were examined and photographed, and the test repeated to check the results.

The results of the preliminary investigation show that the watch glass containing agar over which was suspended the disc containing 225 micrograms of radium, showed a very slight growth of fungi around the edge. There were several light colored spots in the agar near the center of the watch glass, but they could not be identified as fungus colonies.

However, the control was covered with a heavy growth of fungi.

EXAMPLE II

DETERMINATION OF EFFECTS OF ALPHA PARTICLES

The test described in Example I was repeated with the exception that the disc containing 225 micrograms of the radium was covered by a steel plate one-thirty second inch thick. The steel plate was used to absorb the alpha particles and to allow the passage of most of the beta and gamma particles. Upon completion of the five-day exposure, the watch glasses containing agar, which were placed in the tubes, were examined and the test repeated to check the results.

After the five-day exposure, the watch glass, containing agar over which was suspended the disc containing 225 micrograms of radium covered by a steel plate, was covered with a heavy growth of fungi as was the agar of the control, it being impossible to distinguish between the two.

A similar test was made using a small patch of ordinary writing paper as the screen, with the radio-active material only about ½" above the agar medium, and was incubated for 7 days, with a further verification of the aforedescribed results.

These test indicated that it is the alpha rays that are effective in the inhibiting of fungus growth.

PREPARATION OF RADIUM FOILS

Samples of foil containing radium sulphate in various concentrations were obtained to continue the investigation. The foil was prepared by welding a mixture of gold and radium sulphate in block form to a plate of silver and by rolling the block out to the desired thickness and concentration of radium.

The following table shows the size and concentration of the foils:

*Table*

| Sample No. | Dimensions, Inches | Total Concentration, Micrograms of Radium |
|---|---|---|
| 1 | ¼ x 2 | 8 |
| 2 | ½ x 2 | 16 |
| 3 | ½ x 2 | 30 |

EXAMPLE III

DETERMINATION OF RESISTANCE TO FUNGUS ATTACK OF LENS TREATED WITH A FOIL CONTAINING RADIUM

Two lenses, each two and one-half inches in diameter, were obtained from a pair of binoculars. Both lenses were cleaned with methanol and examined microscopically to note the condition of the surface. The surfaces of the lenses then were coated with a smooth layer of mineral nutrient malt agar, approximately one-thirty-second of an inch thick. One of the lenses then was treated with foil containing radium. A strip of foil one-eighth of an inch wide was cemented to the lens mount in such a manner that the foil surrounded and was perpendicular to the surface of the lens. The foil used contained thirty micrograms of radium. Both lenses then were heavily inoculated with a mixed culture of fungi, the open end of each housing covered with a glass plate, and incubated for seven days at a temperature of 30° C. and a relative humidity of 95 to 100 per cent. At the end of this period lenses were examined microscopically.

Upon completion of the seven-day incubation period, the lens without the radium foil treatment showed a heavy growth of fungi over the entire surface of the lens. There was no evidence of fungus growth on the treated lens.

EXAMPLE IV

DETERMINATION OF MINIMUM RADIUM CONCENTRATION NECESSARY

To determine the minimum concentration of radium necessary, the test described in Example III was repeated, with the exception that the area of the foil and the concentration of radium were reduced to three-eighths square inch and fifteen micrograms, respectively. The foil was cut into three pieces, each one inch by one-eighth inch and containing five micrograms of radium. The three pieces of foil were cemented to the lens mount equidistant from each other on the perimeter of the lens.

Upon completion of the seven-day incubation period the lens without the radium foil treatment showed heavy growth of fungi over the entire surface. The treated lens showed a slight growth of fungi on the surface of the lens.

EXAMPLE V

DETERMINATION OF RESISTANCE OF TREATED TRANSIT TELESCOPES TO FUNGUS ATTACK

Two telescopes from engineer transits were obtained to determine the resistance to fungus attack of an instrument so treated. One of the telescopes was disassembled and each of the five lenses was treated by cementing narrow strips of foil to the lens mount in such a manner that the foil surrounded and was perpendicular to the surface of the lens. The total area of the foil used was 1.35 square inches and the total amount of radium was twenty-four micrograms. An effort was made to assure protection to both sides of each of the three internal lenses and the inner side of the objective and eyepiece. The lenses of the two telescopes were examined microscopically to note their condition. No nutrient agar was applied to the lenses in this test. The telescopes then were assembled to determine whether vision with the treated telescope was impaired. The treated telescope and the untreated one were placed in the tropical testing chamber and subjected to prolonged exposure.

A visual examination of the treated telescope as compared to the untreated control indicated that visibility was not impaired by the use of the radium foil. After five weeks exposure in the tropical testing chamber, a moderate growth of fungi was evident on the lenses of the untreated telescope under microscopic examination, but the treated lenses were free from fungus growth. In addition, numerous mites, dead and alive, were found on the lenses of the untreated telescope. No live mites were found on the treated lenses but a few dead ones were noticed near the edge of the objective. This exposure was continued for a period of about 15 months, after which time the treated telescope was still free from fungus growth, whereas the untreated telescope was completely destroyed as an optical instrument.

While the foregoing description and examples are applied specifically to the use of radium foil for the indicated purpose of the present invention, it will be apparent that the radium may be carried otherwise, such as, for example, on a ceramic surface, or on a button which may be screwed into the side walls of an optical instrument. Also radio-active compounds other than radium sulphate may be employed, for example, uranium compounds, or mesothorium. However, uranium compounds do not emit as great a percentage of alpha particles as do the radium compounds, and the quantities of mesothorium available for the purposes of the present invention are limited at present.

The use of radio-active compounds possesses definite advantages over the use of volatile fungicides, the protective effects of the latter being transient, and, therefor, periodic reapplication of the fungicides is required, which is difficult to carry out in the field. The radium foil is permanent in its mounting and effectiveness. Additionally, the volatile fungicides have a tendency to corrode and damage the optical instruments sought to protected. No corrosion hazard is present in the use of radio-active materials.

It will be apparent, therefore, that the present invention is not limited to the specific embodiment thereof herein illustrated and described, but that it may be varied in its details within wide limits as will be apparent to one skilled in the art. Therefore, it will be understood that it is intended and desired to embrace within the scope of this invention such modifications and changes as may be necessary to adapt it to varying conditions and uses, as defined in the appended claims.

In the appended claims it will be understood that the term "lens" is intended to be generic to lenses, prisms, mirrors, or any other light-transmitting or light-reflecting means.

Having thus described my invention, what I claim and wish to secure by letters patent is:

1. In an optical instrument, the combination which comprises a lens, a mount for the lens, and a radio-active carrier adjacent to the mount and also adjacent to the periphery of the lens, the said radio-active carrier being disposed relatively to the mount and lens surface for maintaining the same in a radio-active field containing substantial concentrations of alpha particles, the said carrier carrying effective amounts of radio-active material up to approximately fifteen micrograms thereof for preventing growths of microorganisms on the lens.

2. In an optical instrument, the combination which comprises a lens, a mount for the lens, a metallic foil adjacent to the mount and also adjacent to the periphery of the lens and disposed with a wide surface thereof substantially perpendicular to the lens surface, and a radio-active material on the said wide surface of the foil, the said radio-active material being present in amounts effective for inhibiting growths of microorganisms on the lens up to approximately fifteen micrograms, whereby the lens is maintained in a radio-active field having a substantial concentration of alpha particles.

3. In an optical instrument, the combination which comprises a lens, a mount for the lens, metallic foils secured to the mount on both sides of the lens, the said foils having wide surfaces thereof substantially perpendicular to the lens surfaces, and radio-active material on the said wide surfaces of the foils, the said material being present in amounts from approximately eight micrograms to approximately fifteen micrograms, the said foils extending adjacent to the periphery of the lens and maintaining the lens in a radio-active field containing substantial concentrations of alpha particles for preventing growths of microorganisms on the lens.

RICHARD E. VICKLUND.

REFERENCES CITED

The following references are of record in the file of this patent:

UNITED STATES PATENTS

| Number | Name | Date |
| --- | --- | --- |
| 863,287 | Kunz | Aug. 13, 1907 |
| 1,123,687 | Comstock | Jan. 5, 1915 |
| 1,529,643 | Fenderl | Mar. 10, 1925 |
| 1,645,599 | Jones | Oct. 18, 1927 |
| 2,266,738 | Byler et al. | Dec. 23, 1941 |
| 2,323,787 | Bitner | July 6, 1943 |